(12) United States Patent
Al Jaeedi

(10) Patent No.: US 9,379,576 B2
(45) Date of Patent: Jun. 28, 2016

(54) APPARATUS AND METHOD FOR GENERATING POWER

(71) Applicant: Omar Abu Baker Al Jaeedi, Abu Dhabi (AE)

(72) Inventor: Omar Abu Baker Al Jaeedi, Abu Dhabi (AE)

( * ) Notice: Subject to any disclaimer, the term of this patent is extended or adjusted under 35 U.S.C. 154(b) by 2 days.

(21) Appl. No.: 14/312,960

(22) Filed: Jun. 24, 2014

(65) Prior Publication Data

US 2015/0014991 A1  Jan. 15, 2015

(30) Foreign Application Priority Data

Jul. 10, 2013 (EP) .................................... 13175905

(51) Int. Cl.
| | | |
|---|---|---|
| *H02J 7/14* | (2006.01) | |
| *H02J 7/16* | (2006.01) | |
| *B60L 11/02* | (2006.01) | |
| *B60L 11/12* | (2006.01) | |
| *B60L 11/18* | (2006.01) | |

(52) U.S. Cl.
CPC ............... *H02J 7/1415* (2013.01); *B60L 11/02* (2013.01); *B60L 11/12* (2013.01); *B60L 11/1809* (2013.01); *H02J 7/16* (2013.01); *B60L 2270/40* (2013.01); *Y02T 10/7005* (2013.01); *Y02T 10/7072* (2013.01); *Y02T 10/7077* (2013.01); *Y02T 90/14* (2013.01)

(58) Field of Classification Search
CPC ..... B60L 11/02; B60L 11/12; B60L 11/1809; H02J 7/16; H02J 7/1415
USPC .................................................. 290/1 R, 50
See application file for complete search history.

(56) References Cited

U.S. PATENT DOCUMENTS

| | | | | |
|---|---|---|---|---|
| 8,049,362 B2* | 11/2011 | Darroman et al. | ............... | 307/46 |
| 8,446,022 B2* | 5/2013 | Jiang et al. | ..................... | 290/1 R |
| 8,643,201 B2* | 2/2014 | Scott | ............................. | 290/1 R |
| 2008/0084071 A1* | 4/2008 | Zhu | ................................. | 290/55 |
| 2009/0315338 A1* | 12/2009 | Ylvisaker | ..................... | 290/1 R |
| 2010/0072760 A1* | 3/2010 | Anderson et al. | ............. | 290/1 R |
| 2010/0270810 A1* | 10/2010 | Liebermann | .................. | 290/1 A |

FOREIGN PATENT DOCUMENTS

| | | |
|---|---|---|
| DE | 75 31 887 U 25 U | 11/1976 |
| GB | 2 176 542 A1 | 12/1986 |
| JP | S59 209004 A | 11/1984 |
| WO | 2010/133863 A2 | 11/2010 |
| WO | 2011/125862 A1 | 10/2011 |
| WO | 2012/077444 A1 | 6/2012 |

* cited by examiner

*Primary Examiner* — Tulsidas C Patel
*Assistant Examiner* — Viet Nguyen
(74) *Attorney, Agent, or Firm* — Duane Morris LLP

(57) ABSTRACT

An apparatus (100) couples to a vehicle (101) movable in relation to a medium (103). The vehicle (101) comprises a vehicle wheel (105) attached to an axle (107). The apparatus (100) comprises a driving wheel (110) configured to couple to the vehicle wheel (105) or to a vehicle axle (107) or to couple directly to the medium (103); a generator (120) configured to generate electrical power based on a rotation of the driving wheel (110), wherein the vehicle wheel (105) rotates upon a motion of the vehicle (101) as consequence of a friction of the vehicle (101) with the medium (103); a battery (130), configured to store the generated electrical power; and a control unit (140) configured to transform the generated electrical power to a predetermined level used for charging the battery (130).

4 Claims, 6 Drawing Sheets

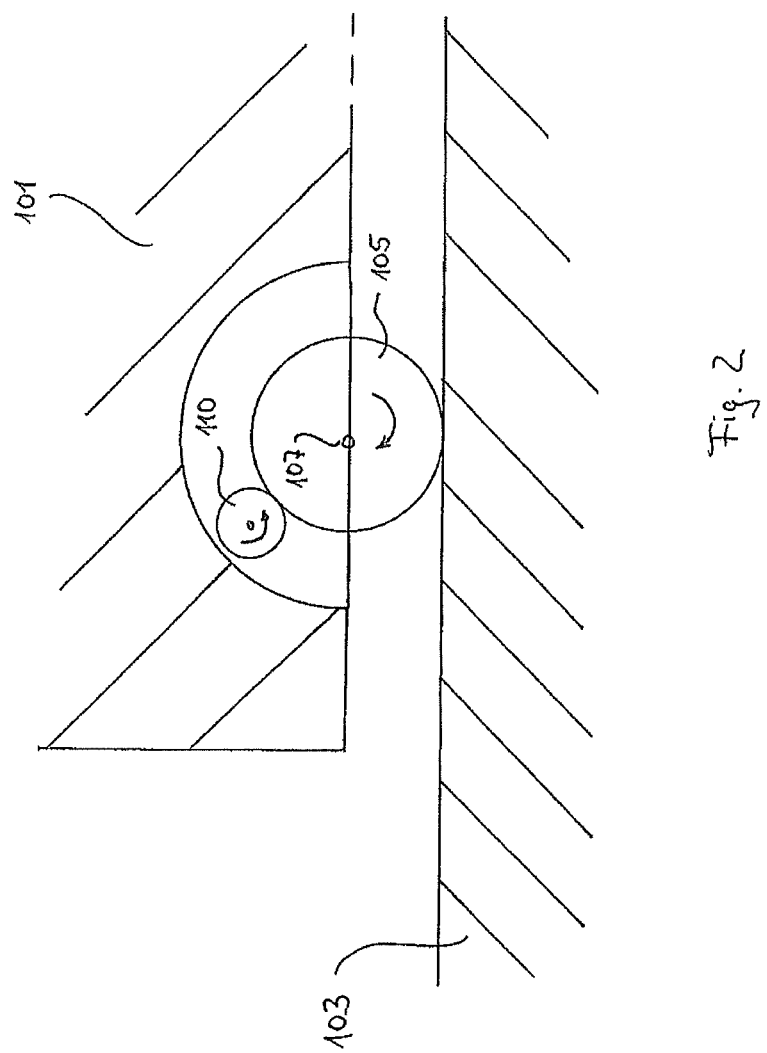

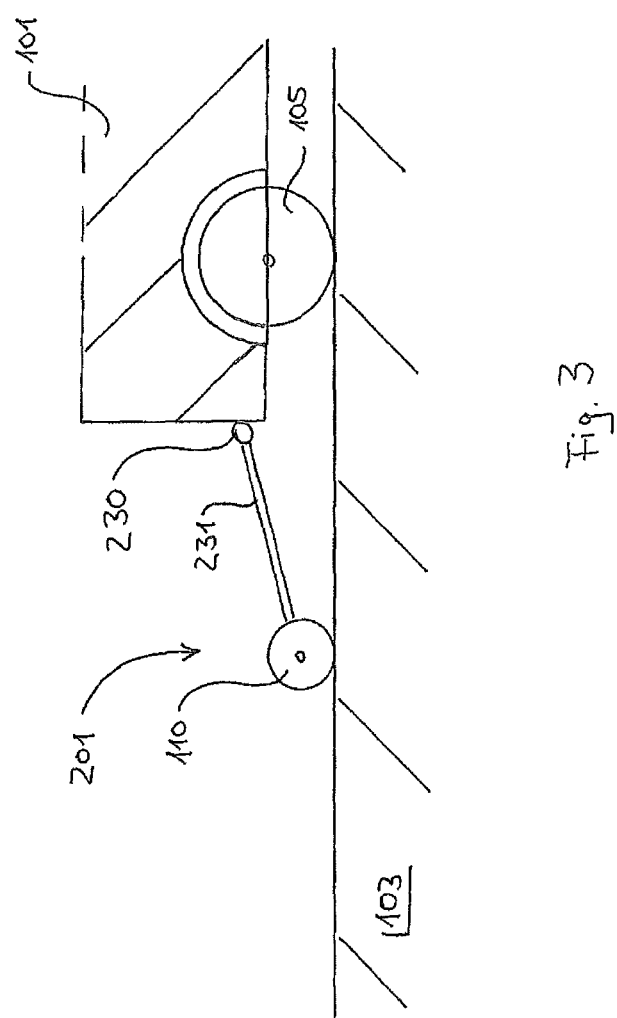

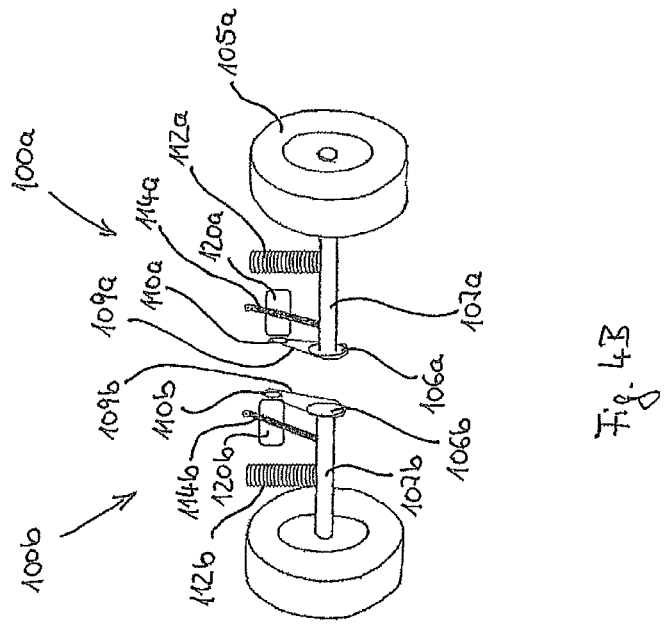
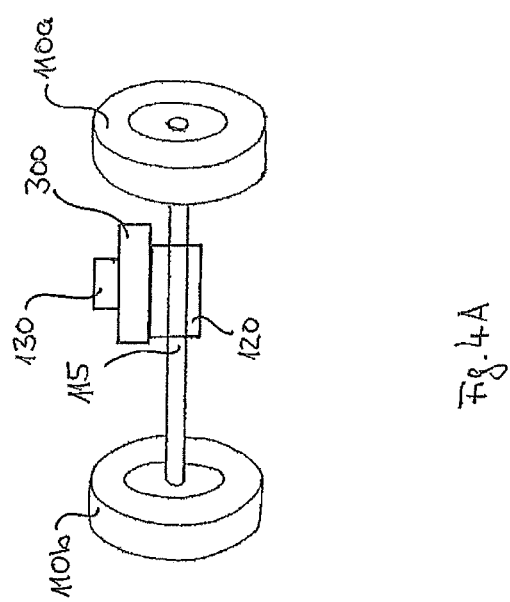
Fig. 4B
Fig. 4A

APPARATUS AND METHOD FOR GENERATING POWER

RELATED APPLICATIONS

This application claims the priority benefit of European Patent application EP 13 175 905.2 filed 10 Jul. 2013, the entirety of which is hereby incorporated herein by reference.

FIELD OF THE INVENTION

The present invention relates to an apparatus configured to couple to a vehicle to generate electric power and a method for the same.

BACKGROUND

More and more appliances rely on electrical power stored in batteries. This triggers an increased demand to generate electric power independently of a central power supply, for example, provided by the household electric outlets. In particular, for outdoor activities without having access to electric outlets, there is a desire to charge batteries with a commonly or at least under most circumstances, available energy source. Kinetic energy is one example of such source of energy that is in many situations available and which might be usable for charging different kinds of batteries. This kinetic energy can, for example, be provided by different kinds of vehicles, as for example, cars. Although most cars have already a power outlet which can be used for charging batteries, these outlets are typically very limited with respect to the available charging power. Therefore, it would be desirable to use directly the kinetic energy of the vehicle to generate electrical power in order to overcome the limits imposed by unavailable electric outlets.

OVERVIEW OF THE PRESENT INVENTION

The aforesaid problems are solved by an apparatus according to claim 1 and a method according to claim 4. Claims 2 and 3 relate to specifically advantageous realizations of the subject-matter of the independent claims.

Accordingly, the present invention provides an apparatus configured to couple to a vehicle which is movable in relation to a medium, wherein the vehicle comprises a vehicle wheel attached to an axle. The apparatus comprises a driving wheel configured to couple to the vehicle wheel and/or to a vehicle axle and/or to couple directly to the medium. The apparatus further comprises a generator configured to generate electrical power based on a rotation of the driving wheel, wherein the vehicle wheel rotates upon a motion of the vehicle as consequence of a friction of the vehicle or the vehicle wheel with the medium. The apparatus further comprises a battery which is configured to store the generated electrical power and a control unit which is configured to transform the generated electrical power to a predetermined level used for charging the battery.

Therefore, the electrical power can be obtained from the kinetic energy of the vehicle. However, the present invention does not only provide electrical energy, but embodiments provide also an increased efficiency of the vehicle itself. Therefore, the present invention addresses also the increased demand in increasing the efficiency of energy consumption and energy generation, i.e. to increase the conversion efficiency of energy in a desired form with only limited losses. Since most kinetic energy is finally lost in Joule heating, there is an increased demand to improve the usage of fossil energies and thereby increase the efficiency of an increased energy use.

Therefore, in further embodiments the vehicle may be a motor-driven vehicle which is configured, during operation, to provide an efficiency signal indicating a current efficiency of the motor-driven vehicle during the motion. The control unit may be configured to receive the signal from the motor-driven vehicle and may be configured to control the generator and/or the battery to generate and store more electrical power if the efficiency signal indicates currently a higher efficiency for the motor-driven vehicle, and to generate and store less electrical power if the efficiency signal indicates a lower efficiency.

The efficiency signal may, for example, be based on the efficiency index or the fuel consumption under a current operating condition.

In further embodiments the vehicle is configured to provide a stop signal indicating an activation of vehicle brakes. The control unit may further be configured to receive the stop signal and to control the generator and/or the battery to increase the generation of electrical power upon the receipt of the stop signal. In further embodiments, the stop signal and/or the efficiency signal may comprise a level and the control unit is configured to control, based on the level, the generation of power.

In further embodiments the driving wheel may couple to the vehicle wheel so that the driving wheel couples to the vehicle wheel comprise parallel rotational axes, but rotate in opposite directions. The driving wheel may be driven by the vehicle wheel due to the friction between both wheels.

In further embodiments the apparatus may further comprise coupling means for achieving the coupling between the driving wheel and the vehicle wheel, wherein the coupling means may comprise at least one of the following: a belt, a chain, one or more toothed wheels, one or more toothed belt, and a gear box.

In further embodiments the apparatus may further comprise a base configured to secure the generator and/or a shock absorber configured to absorb shocks applied to the vehicle wheel and transmitted to the driving wheel via the coupling.

In further embodiments the medium may be a ground on which the vehicle moves and the driving wheel may couple directly to the ground. The apparatus may further comprise an attachment unit configured to attach at least the generator of the apparatus to the vehicle such that at least the generator is towed by the vehicle while being in contact with the ground. In further embodiments the whole apparatus is towed by the vehicle.

In further embodiments the medium is air and/or water and the driving wheel may comprise a paddle wheel which is configured to rotate driven by a relative motion of the vehicle to the air and/or the water. For example, the base may comprise a plate or may be configured to swim in water so that the apparatus or a part thereof can be towed by a boat.

Embodiments relate also to a vehicle with the apparatus, wherein the vehicle may, for example, be one of the following: a car, a train, a trailer, a boat, an airplane.

Further embodiments relates also to a method for generating electrical power by an apparatus configured to couple to a vehicle, the vehicle may be movable in relation to a medium and may comprise a vehicle wheel attached to an axle. The method comprises the following steps: coupling a driving wheel to the vehicle wheel or to a vehicle axle or directly to the medium; generating electrical power based on a rotation of the driving wheel, wherein the vehicle wheel rotates upon a motion of the vehicle as consequence of a friction of the vehicle with the medium; storing the generated electrical power; and transforming, by a control unit, the generated electrical power to a predetermined level used for charging the battery.

In further embodiments the vehicle is a motor-driven vehicle and the method may further comprise: providing, during operation of the motor-driven vehicle, an efficiency signal indicating a current efficiency of the motor-driven vehicle during the motion; receiving, by the control unit, the efficiency signal from the motor-driven vehicle; and controlling the generator and/or the battery to generate and to store more electrical power if the efficiency signal indicates a higher efficiency and to generate and store less electrical power if the efficiency signal indicates a lower efficiency.

DETAILED DESCRIPTION OF PREFERRED EMBODIMENTS

The features and numerous advantages of an apparatus according to the present invention will be best appreciated from a detailed description of the accompanying drawings, in which:

FIG. 2 depicts a further embodiment, wherein the apparatus couples to a rear wheel of a vehicle;

FIG. 3 depicts a further embodiment, wherein the apparatus is provided in a trailer towed by the vehicle;

Figure 5:
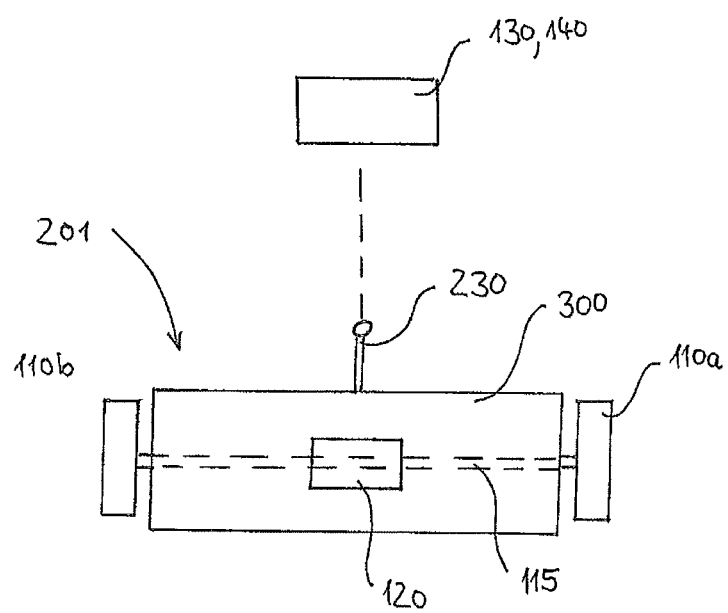
Figure 6:
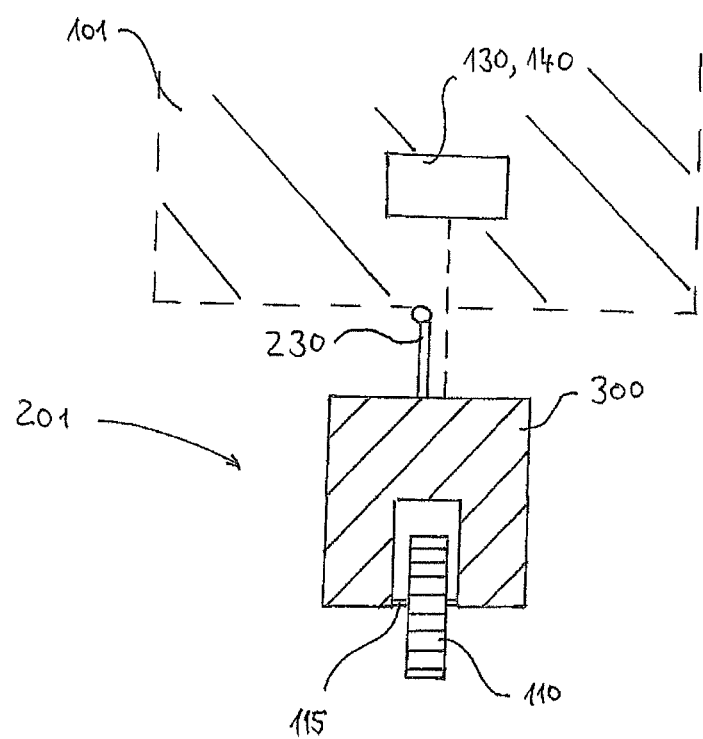

FIG. 4A, B depict further embodiments, wherein the apparatus couples to axles of vehicle wheels;

FIG. 5 depicts a further embodiment, wherein part of the vehicle is secured to a trailer and other parts are stored in the vehicle; and FIG. 6 depicts an embodiment, wherein at least part of the apparatus is secured to a one-wheel-trailer towed by a vehicle.

Figure 1:
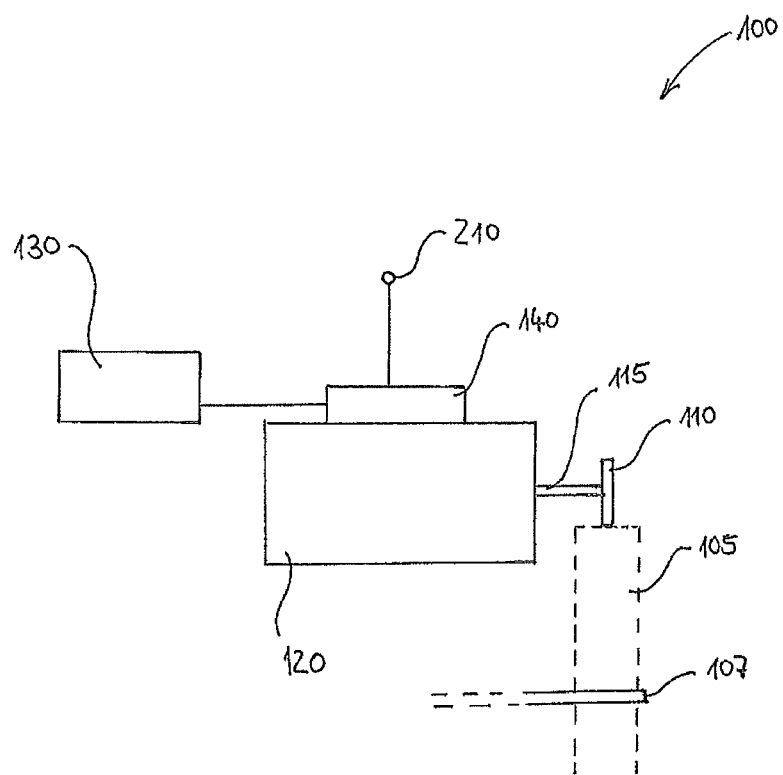
FIG. 1 depicts an embodiment of the present invention.

FIG. 1 shows an apparatus 100 according to an embodiment of the present invention which is configured to couple to a vehicle (not shown in FIG. 1) that is movable in relation to a medium (e.g. ground, water or air). The vehicle comprises a wheel 105 attached to an axle 107 that rotate upon the motion of the vehicle as consequence of a friction of the wheel 105 with the medium. The apparatus further comprises a driving wheel 110 that couples to the wheel 105 (as depicted in FIG. 1) and/or the axle 107 of the vehicle and/or the medium. Furthermore, the apparatus comprises a generator 120 and a battery 130, wherein the generators 120 is configured to generate electric power from the rotation of the driving wheel 110, and the battery 130 is configured to store the generated electric power. Furthermore, the apparatus comprises a control unit 140 which is configured to control a charging process of the battery 130, for example, by controlling the generator 120 to provide a predetermined charging current/voltage to the battery 130. The battery 130 can be any means for storing electrical power as, for example, based on electro-chemical or other non-volatile processes so that the stored electrical power is maintained at least for a predetermined time without loss.

Optionally, the control unit 140 comprises a control input 210 to receive a respective control signal, which may be provided by the vehicle. The control signal may indicate the current efficiency of the vehicle or of the efficiency of the engine that drives the vehicle. Most combustion engines do not have a predetermined efficiency factor, but the efficiency depends, for example, on the speed and/or revolutions per minute, temperature and other factors. Therefore, when the engine of the vehicle runs with a low efficiency additional load should be avoided. On the other hand, if the engine runs with a high efficiency further load may be added. To improve the overall efficiency, the vehicle can provide the efficiency signal indicating the efficiency with which the engine currently runs and, therefore, in further embodiments the control unit 140 is configured to control the generator 120 and/or the battery 130 such that electricity is preferably generated during periods, where the vehicle runs most efficiently, but not if the vehicle or its engine does not run efficiently.

Therefore, further embodiments improve the overall efficiency of the vehicle in that the load is lowered (i.e. less electric power is stored in the battery) when the engine runs not efficient, and further load is added (i.e. more electric power is stored in the battery) when the engine runs efficiently.

Moreover, the vehicle may also provide a brake signal (which can be derived from the conventional stop light) indicating that the vehicle is intended to decelerate the vehicle. If this brake signal is valid (indicate the deceleration), the control unit may control the generator and/or the battery to generate a maximum possible electric power and store this electric power in the battery or battery system.

Therefore, embodiments of the present invention cannot only generate electricity but may also be combined with conventional vehicles in order to improve their efficiency (i.e. to provide an efficiency operation mode). The apparatus 100 can be placed in this efficiency operation mode independently of the normal operation mode where electric power is generated completely independent of the efficiency of the vehicle and where the generated electric power is merely used for charging batteries or any other purposes when no electric outlet is available.

The efficiency signal and/or the brake signal may comprise binary values indicating that the respective operation mode (for example the efficiency operation mode or the braking operation mode) is valid. However, it is also possible, that the efficiency signal and/or the brake signal comprise different values or levels indicating the degree of efficiency or non-efficiency under which the engine currently runs, or the degree of braking or intended deceleration is indicated. Therefore, in further embodiments, the control unit is configured to control the generator and/or the battery to generate electric power based on the level of the efficiency signal and/or the brake signal.

Moreover, the apparatus 100 may comprise means for stabilizing the power in order to enable a charging process of the batteries 130 which is most efficient by keeping control of the power, voltage or electric current with which the batteries are charged. This functionality may also be provided by the control unit 140. For example, the kinetic energy of the moving vehicle 101 may vary with time which would result in a variable power generated from the kinetic energy. These variations can be equalized by using the means for stabilizing so that the output electricity is always kept at a particular level. This may also be of advantage, if the kinetic energy is not transformed to store it in the batteries, but is used directly from the generator, e.g. to supply the energy to another appliance.

The driving wheel 110 can be driven by various couplings to the wheel 105 of the vehicle 101 (vehicle wheel).

In FIG. 2 the driving wheel 110 couples directly to the vehicle wheel 105 which is attached to an axle 107. The diameter of the driving wheel 110 can be less than the diameter of vehicle wheel 105. For example, a small driving wheel 110 (or tire) can be attached to the generator 120 (not shown in FIG. 2). Moreover, the generator 120 can be installed on a special base that is equipped with an optional shock absorber so that the whole system can be accommodated in a space over the vehicle wheel 105. When the small driving wheel 110 of the generator 120 is attached to the vehicle wheel 105, it can rotate and generate electricity upon rotation of the wheel of the vehicle 101. Hence, whenever the vehicle 101 moves, electric energy is generated and stored.

FIG. 3 shows a further embodiment, wherein the apparatus 100 is secured on a trailer 201 which is towed by the vehicle 101 when the vehicle 101 moves on a road (or ground) as one example for the medium 103. Thus, in this embodiment the driving wheel 110 couples directly to the medium 103 or indirectly via the medium 103 to the vehicle wheel 105. The apparatus 100 on the trailer 201 may be attached to the vehicle 101 by attaching means 230 which are configured so to provide a releasable connection between the trailer and the vehicle 101. For example, the attaching means comprise one or more arms 231 and the trailer 201 may comprise a base (not shown in FIG. 3) on which the apparatus 100 is secured. This arm 231 can be fixed and attached behind the vehicle 101. Therefore, when the vehicle 101 moves the driving wheel 110 is driven by the friction to the road 103 to rotate and to generate electricity, which can again be stored in the battery while moving the vehicle 101. In further embodiments the driving wheel 110 does not couple directly to the road, but couples instead to an axle on which the wheel of the trailer secured. In this embodiment, the trailer may itself represent the vehicle which may be towed by another (motor-driven) vehicle.

In further embodiments, the driving wheel 110 does not couple to the road on which the vehicle 101 moves, but to the air streaming around the vehicle. For this case, the medium 103 is the air around the vehicle. Therefore, the driving wheel 110 may, for example, be configured as a paddle wheel or as a wind wheel (including e.g. wind blades) so that the streaming air around the vehicle 101 will exert a force on the paddle wheel (or on the rotor blades), thereby rotating the paddle wheel and generating electricity. Therefore, in further embodiments the apparatus 100 with the generator 120 is configured as a wind turbine wherein the driving wheel 110 rotates driven by the wind, wherein the apparatus 100 can be attached to a side or top of the vehicle 101, which will rotate when the air starts flowing around the vehicle, thereby generating electricity from the wind stream.

In further embodiments, an optional belt or chain can be used to couple the driving wheel 110 of the generator 120 to the wheel of the vehicle 101 to generate electricity. The generator 120 can be fixed to the body of the vehicle. Optionally, the apparatus comprises a pulley, e.g. attached to the wheel of the vehicle, which is configured to tie or to span the belt between the generator 120 and the vehicle wheel 105 or between the driving wheel 110 and the vehicle 105.

FIG. 4A shows a further embodiment, wherein the axle 115 passes through the generator 120 connects a first driving wheel 110a with a second driving wheel 110b with each other. The generator 120 may be secured to a base 300 which in turn can be attached to the vehicle 101. Upon rotation of the first and second driving wheel 110a, b electricity is generated in the generator 120 and stored in the battery 130. The shaft or axle 115 is in this embodiment unitarily formed. However, in further embodiments two or more shafts or axle 115 can couple to the generator 120 (e.g. from two sides).

FIG. 4B shows a further embodiment wherein two apparatuses 100a, 100b according to embodiments of the present invention are combined with each other, wherein one the two apparatuses couples to a first vehicle wheel 105a (for example, the right wheel) and the other to a second vehicle wheel 105b (for example, the left wheel), both vehicle wheels 105a,b rotate upon moving the vehicle 101. In the embodiment as depicted in FIG. 4B, the first driving wheel 110a of the first apparatus 100a couples to a first axle wheel 106a secured by a first axle 107a via a first coupling mean (e.g. a chain or a first belt) 109a so that upon rotation of the first vehicle wheel 105a the first driving wheel 110a rotates and generates electricity. Moreover, the second apparatus 100b comprising a second driving wheel 110b which is coupled to a second axle wheel 106b secured on a second axle 107b via a second coupling mean (e.g. a chain or a first belt) 109b so that upon rotation of the second vehicle wheel 105b the second driving wheel 110b rotates and generates electricity.

In the embodiment as depicted in FIG. 4B, respective further shock absorbers 112a, b are attached to the first and second axes 107a, b. The generators 120a,b and, in particular, the axle wheels 106 are secured close to respective attachment structures 114a, 114b for the first and second axles 107a, b. Therefore, when shocks occur they can be absorbed by the shock absorber 112a, 112b without generating larger shifts for first and second axle wheels 106a, b or the respective driving wheels 110a, b. Thus, a secure transmission can be achieved.

FIG. 5 depicts a further embodiment, wherein the first and second driving wheels 110a, b are not vehicle wheels (as in FIG. 4) but the base 300 is part of a trailer 201, i.e. the two opposite wheels 110a and 110b can be towed by the vehicle 101 (not shown in the overview of FIG. 5). Both driving wheels 110a, b are connected by one or more axles 115 that couple to the generator 120. In further embodiments also multiple generators 120 as, for example depicted in FIG. 4, are arranged on the base 300 towed by the vehicle 101. The base 300 may provide a frame that holds the generator 120, the battery 130 and control unit 140. However, the battery 130 and the control unit 140 may also be stored in the vehicle 101. In addition, optional attaching means 230 are provided which are configured to releasably attach the base 300 to the vehicle 101.

By using the base 300 and special wheels on each side, it is possible to tow the base 300 with the vehicle 101 so that whenever the vehicle 101 moves, the first and second driving wheel 110a, 110b will start to rotate due to the friction to the ground so that electricity is generated by the generator 120 due to the rotating one or more axles 115.

Further embodiments relate also to bases 300 that can be used in boats in water (or other swimming vehicles). By configuring the driving wheels 110 as paddle wheels and immerse them into water as medium 103, the paddle wheels will start rotating when the swimming vehicle starts moving through the water and electricity is generated from the kinetic energy of the swimming vehicle 101.

FIG. 6 depicts a further embodiment, wherein the apparatus 100 comprises a single driving wheel 110 which is secured to a base 300 which in turn is attachable to the vehicle 101 via the attaching means 230. The base 300 may support also more than one single driving wheel 110 via the axle 115 and the attachment means 230 may provide an optional connector to provide a connection to the battery 130 and the control unit 140 which may be installable on the vehicle 101 or, optionally, on the base 300. The base 300 may be formed as a support or as a frame and/or may be formed as a swimming object which to be towed by a water-base vehicle. The generator 120 secured to the base 300 may also form a one-wheel trailer 201 or extension of the vehicle 101 that tows the one-wheel trailer.

This embodiment may be used for land-based vehicles 101, but it may also be employed for water-based vehicles. For land-based vehicles, the base 300 can be towed the vehicle 101 by using the attaching means 230 and the driving wheel 110 can be a normal wheel which starts rotating when the friction with the ground exerts a force. When using the embodiment of FIG. 6 for water-based vehicles, the support 300 can be a swimming object or a structure which starts swimming upon moving the boat through water, where the wheel 110 may again be a paddle wheel which starts rotating upon moving the boat through the water. Again, the means for attaching 230 are adapted to attach the support 300 to the exemplary boat. In this embodiment, the batteries can be provided on the boat or also on the support 300 in which case, the support 300 should be swimming object.

By installing the generator 120 on a base 300 that is secured and connected to a boat and by configuring the driving wheel 110 such that it rotates, when the water surrounding the boat starts moving relative to the vehicle, the generator can generate electricity, when the driving wheel 110 rotates and causes the generator to spin so that energy can also be generated on water.

Again, the surrounding air may also be employed as medium 103 and the base 300 can also by itself be a boat, which can be towed by another boat (motor-driven or sailing boat) so that the exemplary paddle wheel which is secured to the base 300 rotates when water or air starts moving around the base 300. In other applications, it is also possible, to use paddle wheels for the driving wheel 110 to generate electricity from an air stream (for example for plains).

Aspects of embodiments of the present invention can be summarized as follows.

Embodiments relate, in particular, to engine-driven vehicles based on gasoline, diesel, electricity or any other fuel and generate electrical power by employing the engine to drive the vehicle to generate kinetic energy, which is used to generate electricity by the generator via the coupling to a vehicle wheel (or any other part of the vehicle). The available power is finally only limited by the power of the engine of the vehicle. Therefore, the generated electric power can be made available for all kind of purposes or can be simply stored in the battery or battery banks. The stored energy in the battery may, for example, be used for an electric car to provide additional power if needed (for example if the main battery is discharged completely).

Further embodiments relate to generators installed on the pole shaft after a transmission gear. For example, the generator can be connected to the pole shaft underneath the vehicle or it can be fixed on the transmission shaft that transmits the driving force of the engine to the wheels. On the other hand, by installing the generator on the transmission shaft of a vehicle before the transmission gear, it becomes possible to generate power at all times. By installing the generator on the shaft between two rear wheels, electricity can be generated whenever the rear wheels will rotate. The driving wheel can be attached directly to the shaft or it can be coupled to the shaft by coupling means as, e.g., belts.

In further embodiments, it is also possible to install the apparatus on trailers, which have their own wheels where the generator can couple to. When the trailer is towed by the vehicle 101, the motion can be used to generate electricity which will be stored in the batteries 130 for later use. Further embodiments relate also to apparatuses 100 installed in trains, connected to the wheels of the railway wagons so that when the railways start moving, electricity can directly be used within the railway wagons or saved in the batteries for later use.

The vehicle does not need to be a car or a train, but the present invention can also be applied to boats or any other sea-based vehicle so that a relative motion between the boat and the water can be used to generate electricity from the respective kinetic energy. For example, by placing a paddle wheel (or a special fan) on the side of a moving boat, it becomes possible that this wheel will rotate when it gets into contact with the flowing water when the boat starts moving, so that if the paddle wheel connected to the generator directly or to a turbine, the relative flowing water will cause the generator to rotate and generate electricity.

Therefore, further embodiments relate to paddle wheels or wind wheels on the side or the top or behind of moving boats and are connected to the generator (either directly or via a turbine) to generate electricity, when the boat starts moving and an airflow or waterflow is generated so that the kinetic energy of the boat can be finally used to generate electricity during motion.

Further embodiments relate to street gliders (shoes with wheels) that can be used to couple to the driving wheel 110 and/or the generator 120 to generate electricity while doing exercises with the street gliders. In further embodiments, also strollers are used to generate electricity from the rotating wheels, which can, for example, be used to charge telephones or other electronic devices while using the stroller. Same applies for travelling bags, wherein the rotating wheels can be used to couple to the apparatus according to the present invention in order to provide at least a small amount of electricity while moving the travelling bags.

In further embodiments, the batteries and/or the control unit do not need to be supported on a same frame as the generator 120. For example, the batteries and/or control unit can also be carried by a user (for example, when riding a bicycle), while the apparatus generates electricity to charge the batteries. Same applies to the street gliders, wherein the batteries can be carried by the user instead of attaching the batteries to the street gliders itself. Furthermore, one or more electric storages, as for example batteries or other storage units, may be employed to store the generated electric energy, which may be used for later purposes.

Furthermore, the apparatus may comprise belts connecting different parts so that a rotation of one component can be transmitted to a rotation of another component, both rotating in the same rotational sense.

Moreover, rotating wind or paddle wheels, either for air or water, can be provided to couple the generator to a medium (air or water) so that a kinetic energy with respect to the air or water can also be used to generate electricity.

Further embodiments may also comprise connectors, changers or other gear members or a gear box, which is/are adapted to transform one rotation into another rotation (e.g. of the vehicle wheel and the driving wheel) while either reversing the rotational direction or by transforming the rotational speed which is most suitable for the generator to generate electricity from the available kinetic energy. These gear members may include toothed wheels or gear wheels, belts, chains or other elements suitable to couple one rotation to another rotation. Moreover, a plurality of belts or chains may also be used to couple multiple generators to one driving wheel so that the one or more generators can generate electric power or electric signals which differ from each other, for example by a phase shift or by different amplitudes or frequencies so that the combination of the multiple generators can also generate a polyphase current (e.g. 3-phase current).

As moving vehicle, any kind of vehicle can be considered as, for example, cars, trains, boats, (motor) bikes, trailers, or any other moving objects, even airplanes. All objects are usable that have kinetic energies which can be transformed into electric power by using embodiments of the present invention. The apparatus 100 may be fixed to these objects so that they couple to any kind of vehicle wheel to transmit the energy (or the force) to the generator 120 when the electrical power is generated. Therefore, embodiments can use any part of the vehicle that rotates and where the generator can be installed such as, for example, rotating wheels/tires or a pole or a shaft or an axle between two wheels.

There are different methods available for installing the apparatus according to the present invention as, for example, to installed it on or over wheels or tires of moving objects to provide a direct frictional contact to the vehicle wheel or the tire on the wheel.

By selecting the diameter of the driving wheel 110 accordingly, it is possible to provide an optimal rotational speed for the generator 120 to generate electrical power efficiently. For example, the number of rotations can exceed 3000 revolutions per minute at a certain speed of the vehicle 101 and it can be adjusted accordingly to the particular generator 120 to generate most efficiently electric power. For example, the circumference of a wheel 105 of the vehicle may be in the range between one to two meters, whereas the circumference of the driving wheel 110 of the generator 120 may be between 0.1 to 0.5 or about 0.33 meters. As consequence, around 500 revolutions of the main wheel 105 within one kilometer of driving may result in a total of about 3000 revolutions of the driving wheel 110 (six revolutions per each revolution of the vehicle wheel).

Embodiments relates also to different types of generators 120. For example, when using an alternating current (AC) generator, the AC generator can output power for direct use or for charging the battery 130. The AC generator 120 may, for example, supply a power of about 3300 watts (or between 100 W and 5000 W), provide a voltage of about 220 V (or between 12 V and 360V), and a current of about 15 A (or between 3 A and 50 A). The generator may be placed close to the tire/wheel, whereby an arm 115 could extend from the generator 120 towards the wheel 105. The end of the arm 115 will be connected with an appropriate sized small driving wheel 110 in contact with the tire/wheel of the moving vehicle. Therefore, upon motion of the vehicle it will rotate multiple times when the wheel rotates.

In further embodiments, a direct current (DC) generator of suitable power output is used. Also the DC generator can couple to the vehicle and the achievable power can be adjusted by installing one or more of the DC generator, wherein the number of generators can be adjusted accordingly to the desired amount of power. DC generators provide the advantage that they can charge directly batteries or may also be used as source for an electric-driven vehicle. A DC generator may supply, for example, a power of 1200 Watts (or between 500 W and 5000 W), 12 V (or between 6 V to 100V) and 100 A (or between (10 A and 1000 A).

The generator(s) may be secured in a small container with all generators placed at different locations within the container. The container may be attached to a frame close to the wheel 105 of the vehicle 101 and may couple to the wheel 105 of the vehicle 101 by an arm 115. Again, the driving wheel 110 will rotate a couple of times when the main wheel of the vehicle will rotate just once. For example, if the circumference of the vehicle wheel is 1.83 meters (or between 1 m and 3 m), and the driving wheel 110 has a circumference of 0.6 meters (or between 0.1 m and 1 m), per each kilometer the driving wheel 110 will rotate 1638 revolutions (or between 1000 and 3000 revolutions), whereas the vehicle wheel will rotate only 546 revolutions (or between 300 and 1000 revolutions).

In further embodiments, the generator 120 may also be attached to the pole or axle between two wheels, either within a trailer or the vehicle itself. The generator 120 may also be installed on a bicycle to generate further electricity from the generator 120. Moreover, embodiments can also be used for a trailer for a bicycle whereon the generator 120 is attached to the axle between two wheels so that when moving the bicycle, electricity is generated and stored in the batteries.

Embodiments of the present invention can be used, in particular, for cars, trains and bikes, whereas using rear wheels or towed wheels are most efficient and safest.

The present invention provides the following advantages.

Embodiments of the present invention are easy to use in that there are no major modifications needed for a vehicle. In particular, there is no need to intervene with the engine of the vehicle, because the present invention can use any passive wheel or a trailer towed or attached to the vehicle for generating electric power. The generated electric power is stored in a battery so that this stored energy can either be used for the vehicle itself or for any other purposes. Furthermore, it is safe to use and produces electric energy from kinetic energy. Dependent on the particular vehicle as source for the kinetic energy, it can provide a large amount of electric power. Moreover, it can be used independently of the particular place or time and can thus be used in particular for outdoor activities. Since the kinetic energy of the vehicle can be very large, also the available electric power can be used to charge many batteries within a short period of time. Even while driving the vehicle, the generated energy can be used for many different devices at the same time. It may even be possible to couple a plurality of generators with each other so that depending on the available kinetic energy more electric power can be generated. Since the apparatus can be attached to almost any moving vehicle, the present invention can flexibly be applied in different fields.

In contrast to conventional generators, which couple directly to an engine which consumes, for example, diesel or petrol, the present invention can be used for almost any kind of kinetic energy.

The used generator 120 can be any kind of generator, wherein the generator may comprise at least one AC generator and/or at least one DC generator.

The embodiments described above and the accompanying drawing merely serve to illustrate the subject matter of the present invention and the beneficial effects associated therewith, and should not be understood to imply any limitation. The features of the invention, which are disclosed in the description, claims and drawings, may be relevant to the realization of the invention, both individually and in any combination.

The invention claimed is:

1. An apparatus configured to couple to a motor-driven vehicle movable in relation to a ground on which the vehicle moves, the vehicle comprising a vehicle wheel attached to an axle, the apparatus comprising:
   a driving wheel configured to couple directly to the ground;
   a generator configured to generate electrical power based on a rotation of the driving wheel, wherein the vehicle wheel rotates upon a motion of the vehicle as consequence of a friction of the vehicle with the ground;
   a battery configured to store the generated electrical power;
   a control unit configured to transform the generated electrical power to a predetermined level used for charging the battery; and
   an attachment unit configured to attach at least the generator to the vehicle such that the generator is towed by the vehicle while being in contact with the ground,
   wherein the vehicle is configured, during operation, to provide an efficiency signal indicating a current engine efficiency of the motor-driven vehicle during the motion, wherein the control unit is further configured to receive the efficiency signal from the motor-driven vehicle and is configured to control the generator and/or the battery to generate and to store more electrical power if the efficiency signal indicates a higher efficiency and to generate and store less electrical power if the efficiency signal indicates a lower efficiency, and wherein the vehicle is configured to provide a stop signal indicating an activation of vehicle brakes, and wherein the control unit is further configured to receive the stop signal and to control the generator and/or the battery to increase the generation of electrical power upon the receipt of the stop signal.

2. A vehicle with an apparatus according to claim 1.

3. The vehicle according to claim 2, wherein the vehicle is one of the following: a car, a train, a trailer.

4. A method for generating electrical power by an apparatus configured to couple to a motor-driven vehicle, the motor-driven vehicle is movable in relation to a ground, the motor-driven vehicle comprising a vehicle wheel attached to an axle, the method comprising:

coupling a driving wheel directly to the ground;

generating electrical power based on a rotation of the driving wheel, wherein the vehicle wheel rotates upon a motion of the motor-driven vehicle as consequence of a friction of the motor-driven vehicle with the ground;

storing the generated electrical power;

transforming, by a control unit, the generated electrical power to a predetermined level used for charging a battery;

providing, during operation of the motor-driven vehicle, an efficiency signal indicating a present engine efficiency of the motor-driven vehicle during the motion;

receiving, by the control unit, the efficiency signal from the motor-driven vehicle;

controlling a generator and/or the battery to generate and to store more electrical power if the efficiency signal indicates a higher efficiency and to generate and store less electrical power if the efficiency signal indicates a lower efficiency;

providing, by the motor-driven vehicle, a stop signal indicating an activation of vehicle brakes; and receiving, by the control unit, the stop signal and controlling the generator and/or the battery to increase the generation of electrical power upon receipt of the stop signal.

* * * * *